(12) United States Patent
Hirohara et al.

(10) Patent No.: US 10,549,630 B2
(45) Date of Patent: Feb. 4, 2020

(54) ERRONEOUS OIL FEED PREVENTION DEVICE

(71) Applicant: YACHIYO INDUSTRY CO., LTD., Saitama (JP)

(72) Inventors: Takeshi Hirohara, Tochigi (JP); Daesung Kim, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 16/078,385

(22) PCT Filed: Feb. 16, 2017

(86) PCT No.: PCT/JP2017/005778
§ 371 (c)(1),
(2) Date: Aug. 21, 2018

(87) PCT Pub. No.: WO2017/145914
PCT Pub. Date: Aug. 31, 2017

(65) Prior Publication Data
US 2019/0337381 A1 Nov. 7, 2019

(30) Foreign Application Priority Data
Feb. 22, 2016 (JP) .................................. 2016-030536

(51) Int. Cl.
*B60K 15/04* (2006.01)
*B67D 7/34* (2010.01)

(52) U.S. Cl.
CPC .............. *B60K 15/04* (2013.01); *B67D 7/344* (2013.01); *B60K 2015/0483* (2013.01)

(58) Field of Classification Search
CPC . B60K 15/04; B60K 2015/0483; B67D 7/344
(Continued)

(56) References Cited

U.S. PATENT DOCUMENTS

| 5,730,194 A | 3/1998 | Foltz |
| 2011/0214783 A1 | 9/2011 | Ichimaru et al. |

FOREIGN PATENT DOCUMENTS

| EP | 3 130 498 A1 | 2/2017 |
| JP | 5385288 B2 | 1/2014 |
| JP | 2015-202745 A | 11/2015 |

OTHER PUBLICATIONS

Original and Translation of DE 102008031250 A1; Tsiberids, Konstantinos; Jan. 7, 2010 (Year: 2010).*

(Continued)

*Primary Examiner* — Marina A Tietjen
*Assistant Examiner* — Paul J Gray
(74) *Attorney, Agent, or Firm* — Squire Patton Boggs (US) LLP

(57) ABSTRACT

An erroneous fuel feed prevention device includes paired flaps having a surface slanted relative to a direction of insertion of a fuel feeding nozzle. A turn shaft part, a support hole, and paired extension portions are provided. A first biasing member is configured to bias flaps of the paired extension portions to turn in a closing direction. A first restriction portion and a second restriction portion are configured to restrict the flaps from turning in an opening direction. While slanted surfaces are pressed by the fuel feeding nozzle, each of the flaps slide outward in radial directions of the fuel feed passage to release turning restriction states of the first restriction portion and the second restriction portion, and after the release, the flaps turn in an integrated manner with the extension portions being in contact with the respective other flaps.

6 Claims, 7 Drawing Sheets

(58) Field of Classification Search
USPC .................................................. 141/349, 350
See application file for complete search history.

(56) References Cited

OTHER PUBLICATIONS

International Search Report dated Mar. 28, 2017 corresponding to International Patent Application No. PCT/JP2017/005778, and English translation thereof.
Written Opinion of the International Searching Authority dated Mar. 28, 2017 corresponding to International Patent Application No. PCT/JP2017/005778, and English translation thereof.

* cited by examiner

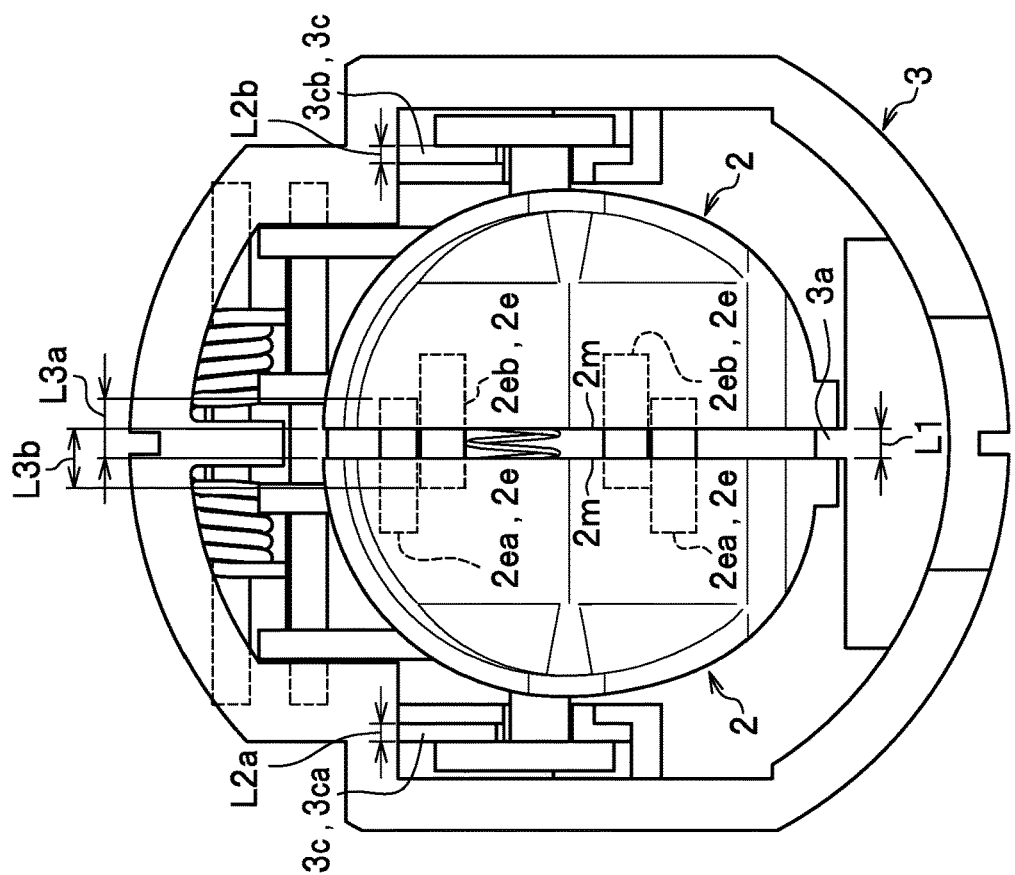
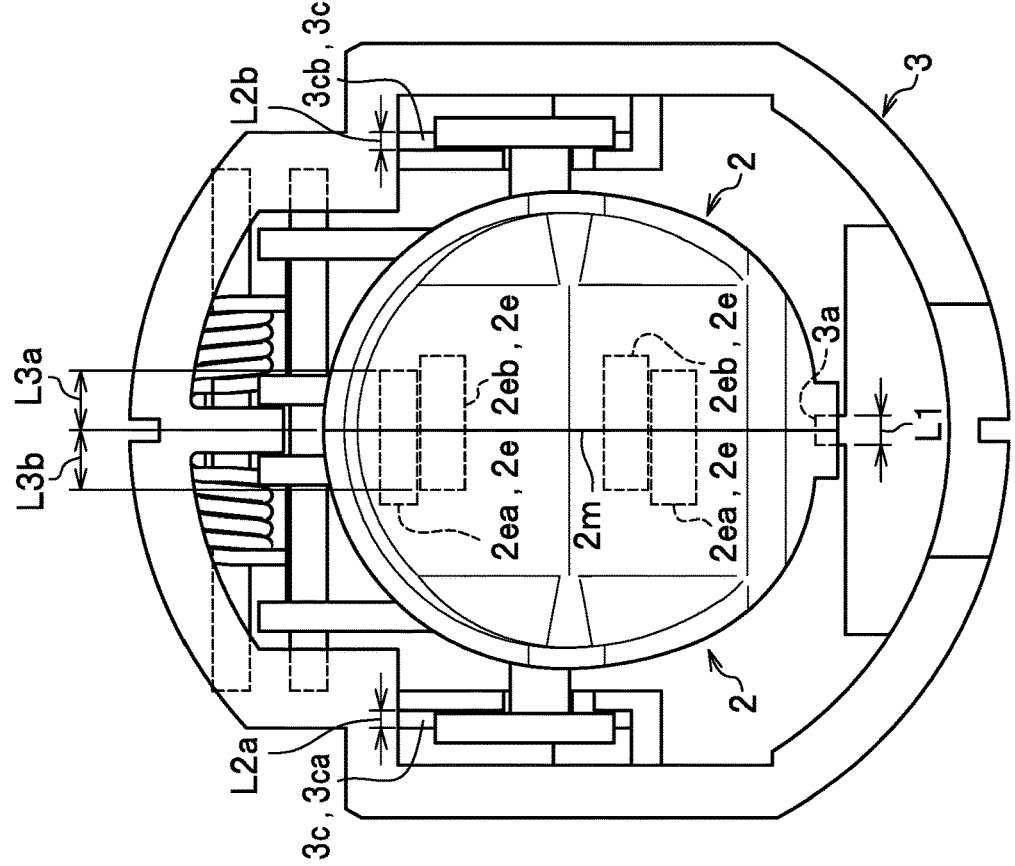

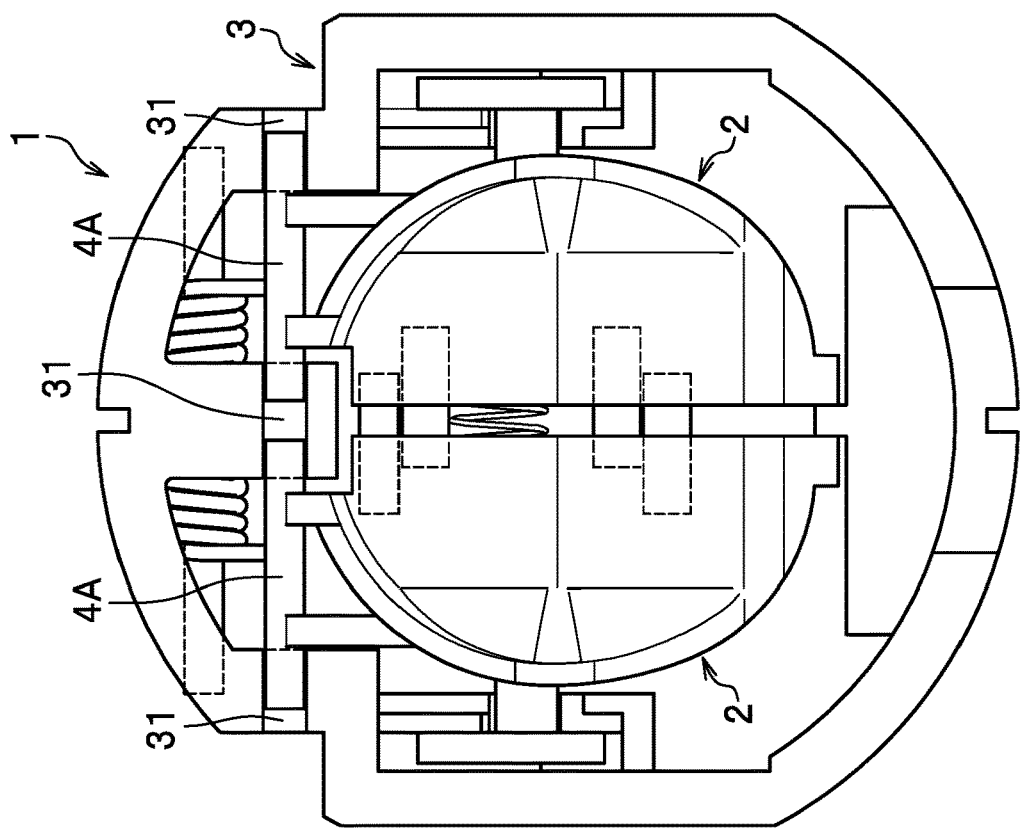
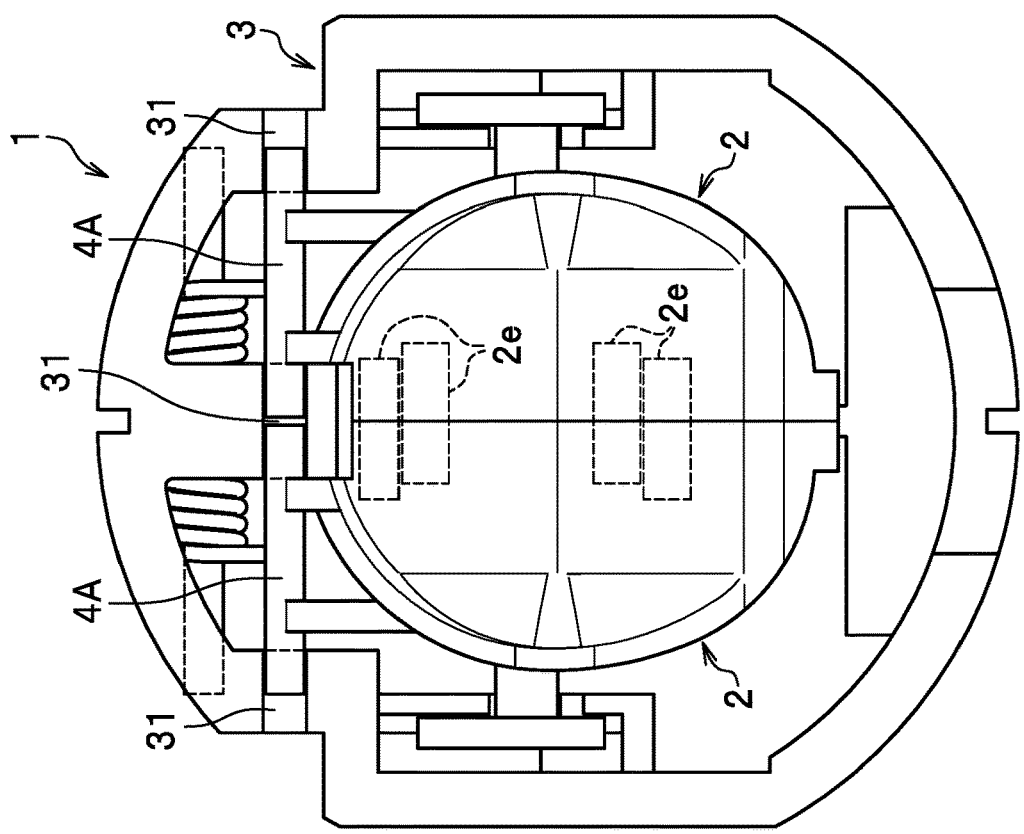

ERRONEOUS OIL FEED PREVENTION DEVICE

TECHNICAL FIELD

The present invention relates to an erroneous fuel feed prevention device.

BACKGROUND ART

There is known an erroneous fuel feed prevention device to be provided on a fuel feed passage in a vehicle such as an automobile to block insertion of a small-diameter fuel feeding nozzle and permit insertion of a large-diameter fuel feeding nozzle. For example, Patent Literature 1 describes a technique for blocking or permitting insertion of a fuel feeding nozzle using paired flaps (shutter members) that open from and close at the center of a fuel feed passage.

A long bearing hole is formed in each flap. A turn shaft member provided to a bearing bracket portion of a housing engages with the bearing hole, and thus the flap is turnable and is slidable in a radial direction of the fuel feed passage.

CITATION LIST

Patent Literature

Patent Literature 1: Japanese Patent No. 5385288

SUMMARY OF INVENTION

Technical Problem

However, since the flaps in the technique of Patent Literature 1 are structured to turn independently of each other, insertion and removal of a fuel feeding nozzle in a manner slanted or shifted to one side may cause troubles such as opening or closing of only one of the flaps and hence result in operational malfunction of the flaps.

The present invention has been created from such a perspective, and has an objective to provide an erroneous fuel feed prevention device capable of reducing operational malfunction of flaps.

Solution to Problem

To achieve the above objective, the present invention is an erroneous fuel feed prevention device to be provided on a fuel feed passage to block insertion of a small-diameter fuel feeding nozzle and permit insertion of a large-diameter fuel feeding nozzle, the device comprising: paired flaps each having a slanted surface that is slanted relative to a direction of insertion of the fuel feeding nozzle and is to be pressed by the fuel feeding nozzle, the paired flaps being slidable in radial directions of the fuel feed passage and being turnable in the direction of insertion; a turn shaft part about which the flaps turn; a support portion supporting the turn shaft part; paired extension portions that extend from a first flap and a second flap of the flaps toward the second flap and the first flap respectively, are in contact with back surfaces of the second flap and the first flap respectively, and are in sliding contact with the second flap and the first flap in a slide direction respectively; a first biasing member that biases the flaps to turn in a closing direction; and a restriction portion that restricts the flaps from turning in an opening direction. While slanted surfaces are pressed by the fuel feeding nozzle, each of the flaps slides outward in radial directions of the fuel feed passage to release a turning restriction state of the restriction portion, and after the release, the flaps turn in an integrated manner with the extension portions being in contact with the respective other flaps.

According to the present invention, the paired flaps turn in an integrated manner. Thus, even if the fuel feeding nozzle is inserted or removed in a manner slanted or shifted to one side, troubles such as opening or closing of only one of the flaps do not occur. Thus, operational malfunction of the flaps is reduced.

Further, since the extension portions have not only a function to guide sliding of the paired flaps, but also a function to allow the paired flaps to turn in an integrated manner, the number of parts is reduced to simplify the structure.

In addition, it is preferable that the paired extension portions are in sliding contact with each other in the slide direction. This stabilizes sliding operation of the paired flaps.

In addition, it is preferable to further comprise a second biasing member that biases the flaps to slide toward each other. This allows the flaps to slide inward in the radial directions of the fuel feed passage and be retained at a closed position. Further, the retention of the flaps at the closed position prevents intrusion of dust and the like from between the flaps into the depth of the fuel feed passage.

In addition, it is preferable that the second biasing member is provided over the paired flaps. This allows the paired flaps to be biased to slide by the single second biasing member, and thus the structure is simplified.

In addition, it is preferable that plural pairs of the extension portions are provided. This stabilizes the integrated turning operation and sliding operation of the paired flaps even more.

In addition, it is preferable that the turn shaft part is provided to each of the flaps and is slidable along the support portion. This allows the paired flaps to move toward and away from each other with a simple configuration.

Advantageous Effects of Invention

The erroneous fuel feed prevention device of the present invention reduces operational malfunction of the flaps.

BRIEF DESCRIPTION OF DRAWINGS

FIGS. 5A and 5B are plan views of a state where the flaps are mounted in the bracket, FIG. 5A being a diagram illustrating the flaps at closed positions and FIG. 5B illustrating the flaps having slid apart.

FIGS. 7A and 7B are plan views of a state according to a modification where flaps are mounted in a bracket, FIG. 7A being a diagram illustrating the flaps at closed positions and FIG. 7B being a diagram illustrating the flaps having slid apart.

DESCRIPTION OF EMBODIMENTS

Figure 1:
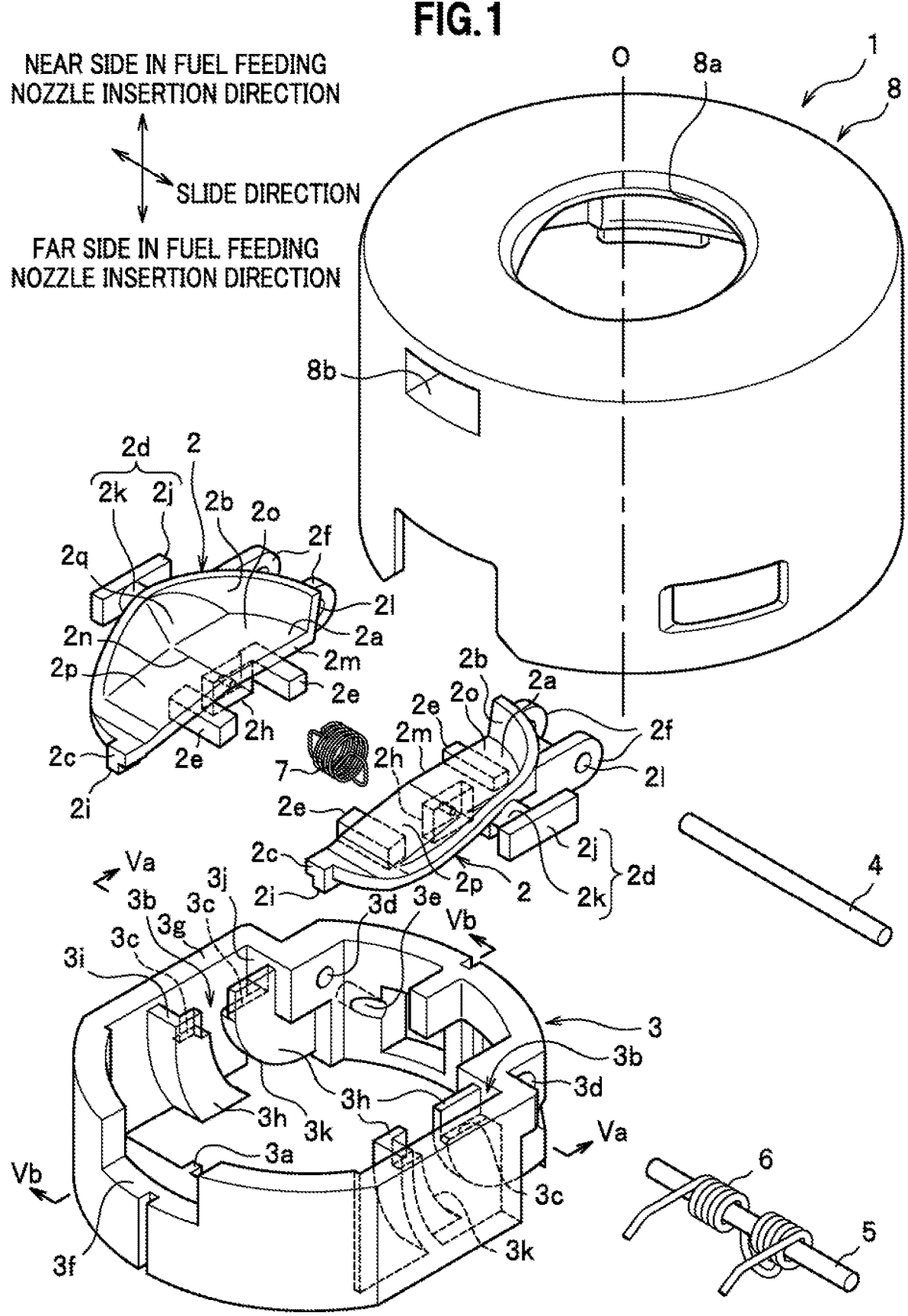
FIG. 1 is an exploded perspective view of an erroneous fuel feed prevention device according to an embodiment of the present invention.

In FIGS. 1 to 4, an erroneous fuel feed prevention device 1 according to an embodiment of the present invention is a device to be provided on a fuel feed passage to block insertion of a small-diameter fuel feeding nozzle (e.g., a fuel feeding gun for gasoline) and permit insertion of a large-diameter fuel feeding nozzle (e.g., a fuel feeding gun for light oil). As illustrated in FIG. 1, the erroneous fuel feed prevention device 1 mainly includes paired flaps 2, 2, a bracket 3, a turn shaft part 4, a spring shaft part 5, a first biasing member 6, a second biasing member 7, and a housing 8.

<Flaps>

The paired flaps 2, 2 are valves that open and close the fuel feed passage. The shapes of the paired flaps 2, 2 are substantially line-symmetric about an axis O which is the center of the fuel feed passage. The flaps 2 are slidable in radial directions of the fuel feed passage and are turnable in the direction of insertion of an fuel feeding nozzle. The directions in which the flaps 2 slide and the direction of the center of the turning of the flaps 2 are in parallel with each other. Each flap 2 has an open/close plate portion 2a, a circumferential wall portion 2b, a first slide portion 2c, a second slide portion 2d, a plurality of pairs of extension portions 2e, 2e, and a plurality of attachment portions 2f, 2f. In the following description, the surface of the flap 2 in closed position that faces the near side in the fuel feeding nozzle insertion direction is referred to as a "front surface", and the surface of the flap 2 in close position that faces the far side in the fuel feeding nozzle insertion direction is referred to as a "back surface".

In close position, the open/close plate portion 2a extends in directions substantially orthogonal to the axis O, and has substantially a semicircular shape in a plan view. A straight edge portion 2m of the open/close plate portion 2a is formed in a radial direction of the axis O. When the straight edge portions 2m, 2m of the paired flaps 2, 2 abut against each other, the fuel feed passage is shut. A slant surface 2q is formed as a part of the open/close plate portion 2a which is farthest away from the straight edge portion 2m (a part at an outer side in the slide direction), the slant surface 2q being slanted relative to the fuel feeding nozzle insertion direction (the axis O direction) and being to be pressed by an fuel feeding nozzle. The slant surface 2q is slanted such that the more outward in the slide direction, the more upward the slant surface 2q is positioned.

The open/close plate portion 2a has a bend portion 2n formed in a radial direction orthogonal to the straight edge portion 2m. At one side of the bend portion 2n, the open/close plate portion 2a has an orthogonal flat portion 2o formed extending orthogonal to the axis O. At the other side of the bend portion 2n, the open/close plate portion 2a has a gentle slant portion 2p formed such that the farther away from the bend portion 2n, the more downward the gentle slant portion 2p is positioned.

Since the bend portion 2n is formed also on the slant surface 2q, the slant surface 2q is also bent at the bend portion 2n. The formation of the slanting-down gentle slant portion 2p effectively allows fuel or foreign matter remaining on the surface of the open/close plate portion 2a to flow outward of the open/close plate portion 2a in a radial direction through the gentle slant portion 2p. Foreign matter and the like that flow out from the gentle slant portion 2p are discharged to the outside through a dust discharge hole 8b of the housing 8 to be described later.

A second spring lock portion 2h is formed on the back surface of the open/close plate portion 2a to lock the second biasing member 7. The second spring lock portion 2h is provided on each of the flaps 2, 2. The second spring lock portion 2h is cuboid. A first spring lock portion 2g is formed on the back surface of the open/close plate portion 2a illustrated in FIG. 2 to lock one end of the first biasing member 6. The first spring lock portion 2g has a groove shape extending in a direction orthogonal to the slide direction.

The circumferential wall portion 2b is, as illustrated in FIG. 1, formed along the axis O from the arc-like circumferential edge portion of the open/close plate portion 2a. On the front surface side of the open/close plate portion 2a, the circumferential wall portion 2b is relatively tall near the orthogonal flat portion 2o. On the front surface side of the open/close plate portion 2a, the circumferential wall portion 2b gets progressively shorter near the gentle slant portion 2p away from the bend portion 2n.

The first slide portion 2c protrudes radially outward from the outer circumferential surface of the open/close plate portion 2a on the open end side. The first slide portion 2c is cuboid. In closed position, the lower surface of the first slide portion 2c comes into contact with the upper surface of a first restriction portion 3a of the bracket 3 to be described later. A flap positioning portion 2i protrudes downward from the lower surface of the first slide portion 2c at an outer portion in the slide direction. When the flap positioning portion 2i comes into contact with a side surface of the first restriction portion 3a, the position of the flap 2 in the slide direction in closed position is determined.

The second slide portion 2d protrudes outward in the slide direction from a center area of the outer circumferential surface of the circumferential wall portion 2b. The second slide portion 2d substantially has a letter-T shape in a plan view. The second slide portion 2d is constituted by a main body portion 2j which has the shape of a rectangular plate long in a direction orthogonal to the slide direction and a solid-cylindrical link portion 2k which extends in the slide direction and links the main body portion 2j to the circumferential wall portion 2b. The main body portion 2j is larger than the outside diameter of the link portion 2k in a direction orthogonal to the slide direction.

As illustrated in FIG. 1, the extension portions 2e extend from the back surfaces of the flaps 2, 2 toward the flaps 2, 2 on the other sides. The number and position of the extension portion 2e are not limited to any particular number or position. In the present embodiment, left and right paired extension portions 2e, 2e are provided on one side and on the other side of the bend portions 2n (i.e., two pairs in total). Moreover, the shape of the extension portion 2e is a cuboid long in the slide direction in the present embodiment, although the shape is not particularly limited thereto.

The tip portion of the extension portion 2e extends beyond the straight edge portion 2m and reaches the flap 2 on the other side, always being in contact with the back surface of the open/close plate portion 2a of the flap 2 on the other side. In other words, the extension portion 2e is in contact with the back surface of the other flap 2 even after the flap 2 slides radially outward and releases the turn restriction state by the first restriction portion 3a and second restriction portions 3c. The paired extension portions 2e, 2e have a function to turn the paired flaps 2, 2 in an integrated manner.

Figure 3:
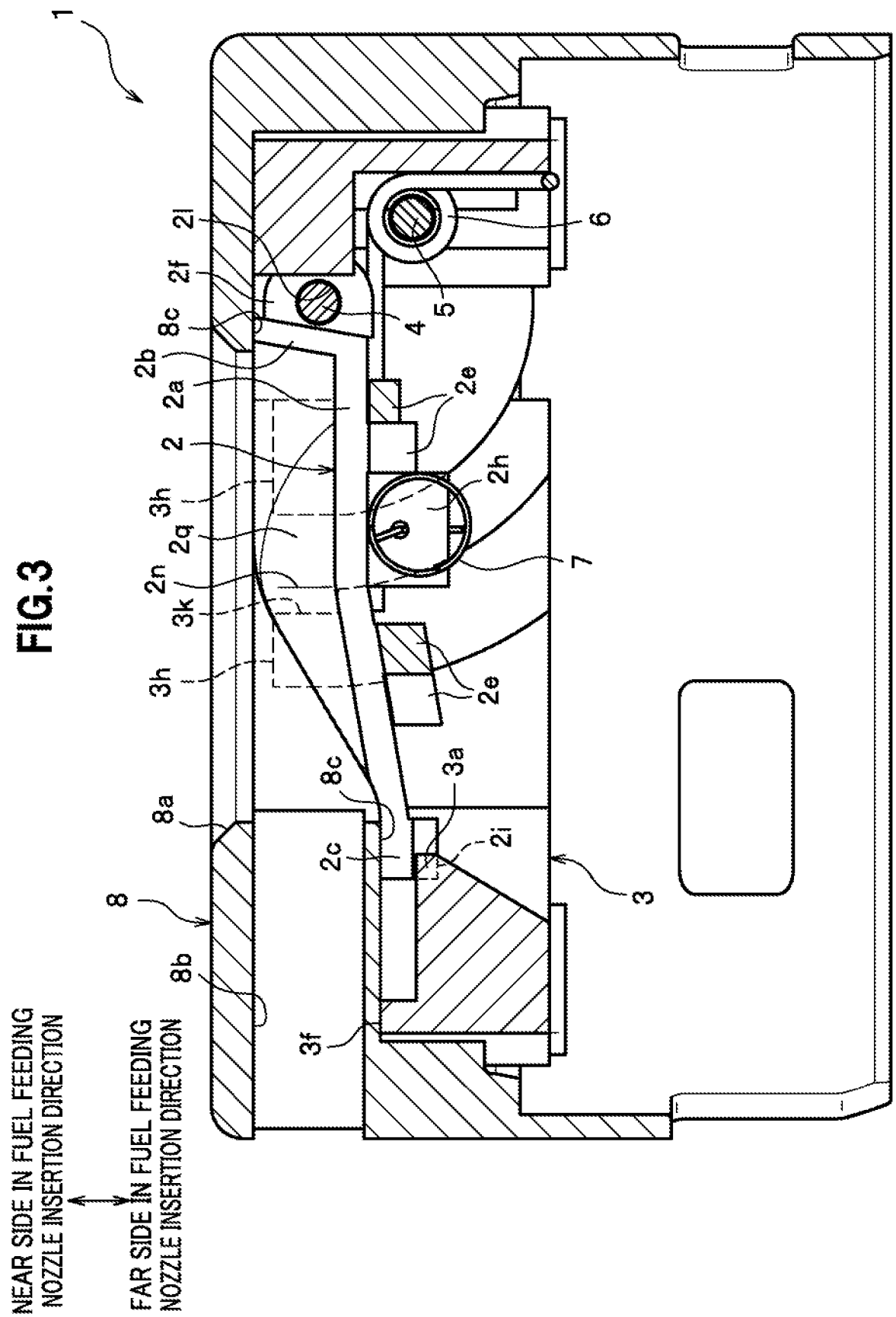
FIG. 3 is a side sectional view taken along the line Vb-Vb in FIG. 1.

The extension portion 2e and the back surface of the other flap 2 are in slidable contact with each other in the slide direction. Further, as illustrated in FIG. 3, side surfaces of the respective paired extension portions 2e, 2e are constantly in contact with each other, and are in slidable contact with each other in the slide direction. The paired extension portions 2e, 2e also have a function to guide the sliding of the paired flaps 2, 2. Note that the side surfaces of the respective extension portions 2e, 2e may be spaced apart.

The paired attachment portions 2f, 2f protrude radially outward from the outer circumferential surface of the circumferential wall portion 2b near the orthogonal flat portion 2o. The attachment portions 2f, 2f are provided with a distance therebetween and are in parallel with each other. Each attachment portion 2f has a plate shape. The attachment portion 2f has a circular attachment hole 2l through which the turn shaft part 4 is inserted. The inside diameter of the attachment hole 2l is smaller than the outside diameter of the turn shaft part 4. The attachment portions 2f are attached around the turn shaft part 4, allowing the turn shaft part 4 to slide and turn.

<Bracket 3>

Figure 4:
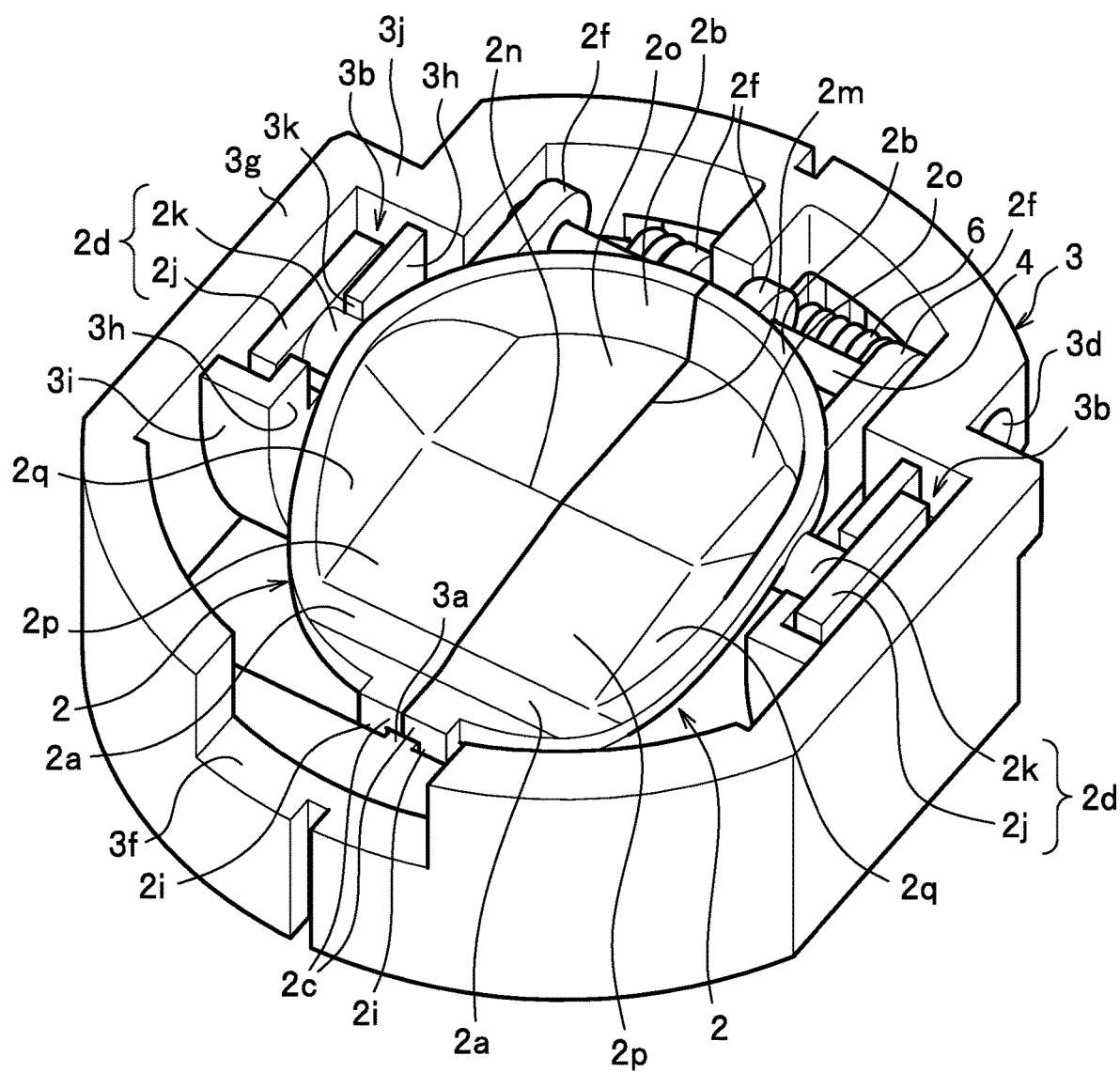
FIG. 4 is a perspective view of a state where flaps are mounted in a bracket.

As illustrated in FIGS. 1 and 4, the bracket 3 is a short, tubular member that supports the flaps 2, 2. The bracket 3 has the first restriction portion 3a, accommodation portions 3b, the second restriction portions 3c, first support holes 3d, 3d, second support holes 3e, 3e, and a dust discharge portion 3f. The bracket 3 has a structure which is line-symmetric in the slide direction.

The first restriction portion 3a is a part that supports the lower surfaces of the first slide portions 2c, and has a function to restrict turning of the flaps 2 in an opening direction. The first restriction portion 3a protrudes radially inward from the inner surface of the bracket 3. The first restriction portion 3a is cuboid. The left half of the upper surface of the first restriction portion 3a supports the first slide portion 2c of one flap 2. The right half of the upper surface of the first restriction portion 3a supports the first slide portion 2c of the other flap 2.

The accommodation portions 3b accommodate the main body portions 2j of the respective flaps 2 in a surrounding manner. Each accommodation portion 3b is constituted by a vertical wall 3g extending in the insertion direction and a direction orthogonal to the slide direction, a lock wall 3h spaced away from the vertical wall 3g inward in the slide direction, a one-edge-side link wall 3i linking one edge of the vertical wall 3g to one edge of the lock wall 3h, and an other-edge-side link wall 3j linking the other edge of the vertical wall 3g to the other edge of the lock wall 3h. The vertical wall 3g and the other-edge-side link wall 3j constitute part of the circumferential wall of the bracket 3.

The lock wall 3h faces the vertical wall 3g. The main body portion 2j is disposed between the vertical wall 3g and the lock wall 3h. An allowance groove 3k is formed in the lock wall 3h to allow the link portion 2k to turn. The allowance groove 3k is formed by being cut in a curve in a side view according to the path the link portion 2k takes in turning. The one-edge-side link wall 3i faces the other-edge-side link wall 3j. The one-edge-side link wall 3i is formed by a curved surface making a curve in a side view according to the path the link portion 2k takes in turning.

Figure 2:
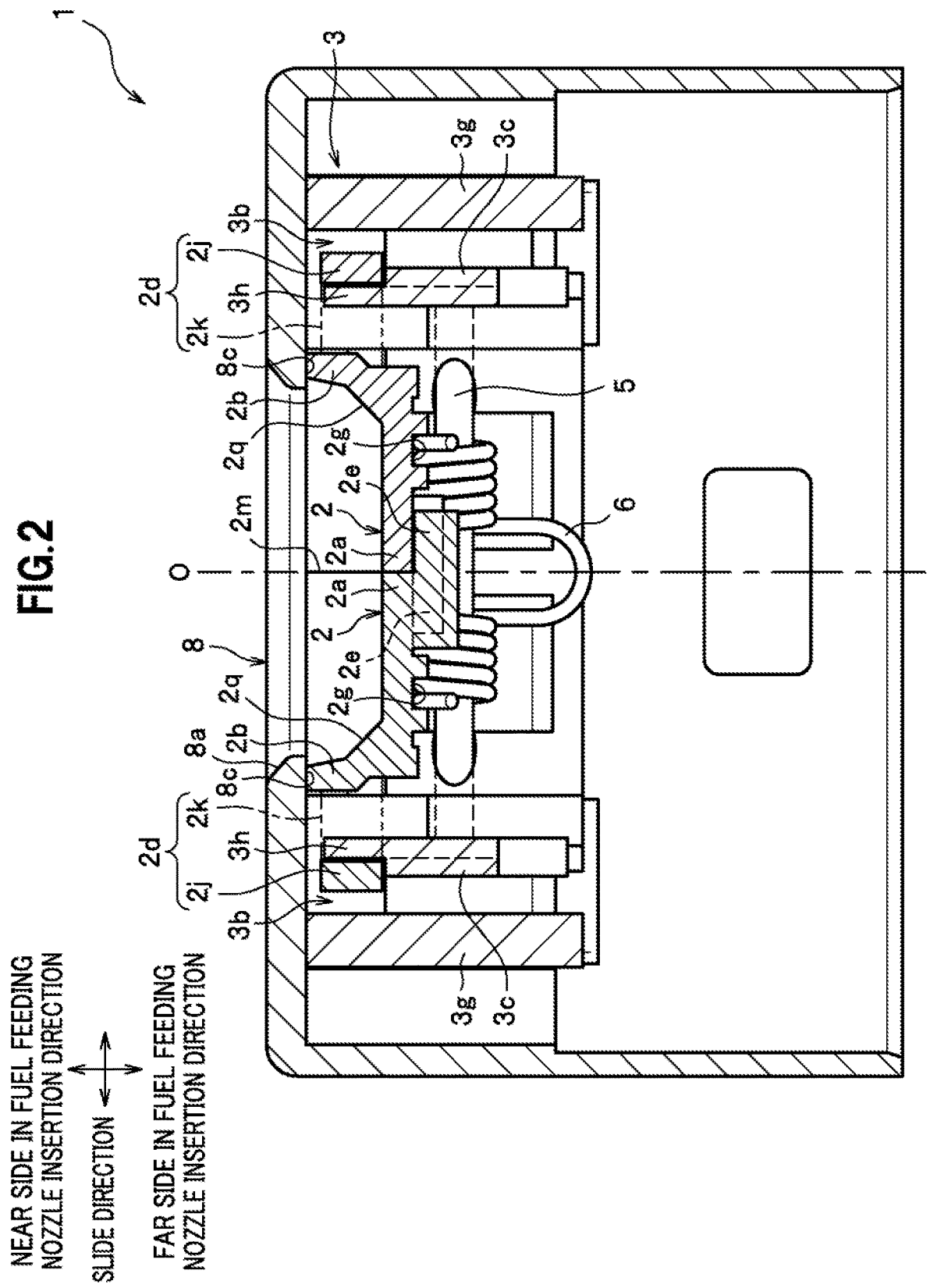
FIG. 2 is a front sectional view taken along the line Va-Va in FIG. 1.

The second restriction portions 3c are, as illustrated in FIG. 2, members that support the lower surface of the main body portion 2j in closed position, and have a function to restrict the turning of the main body portion 2j in an opening direction. The second restriction portions 3c jut out from the outer surface of the lock wall 3h in the slide direction, and are provided at two locations: one on each side of the allowance groove 3k. The second restriction portions 3c are step portions formed at a lower position than the end surface of the lock wall 3h.

The space between the vertical wall 3g and the second restriction portions 3c is for the main body portion 2j to turn when the flap 2 turns. The width of this space is slightly larger than the plate thickness of the main body portion 2j to allow the main body portion 2j to turn. While the flap 2 turns and when the flap 2 is at open position, a side surface of the main body portion 2j is in contact with the second restriction portions 3c. The second restriction portions 3c allow the flap 2 to turn and reach the open position with the flap 2 having slid radially outward. Further, when the flap 2 is to be turned from the open position to the closed position, the flap 2 can return to the closed position without interference between the first restriction portion 3a and the first slide portion 2c.

The paired first support holes 3d, 3d are, as illustrated in FIG. 1, formed in the circumferential wall of the bracket 3 at positions line-symmetric about the axis O. Each first support hole 3d is a circular through-hole penetrating in the slide direction. The first support holes 3d function as support portions that support the turn shaft part 4.

The paired second support holes 3e, 3e are formed in the circumferential wall of the bracket 3 at positions line-symmetric about the axis O. Each second support hole 3e is a circular through-hole penetrating in the slide direction. The second support holes 3e function as support portions that support the spring shaft part 5.

The dust discharge portion 3f is a portion to discharge foreign matter on the flaps 2 in cooperation with the dust discharge hole 8b of the housing 8 to be described later. The dust discharge portion 3f is formed by cutting of a part of the circumferential wall of the bracket 3 in a rectangular shape, the part being located at the opening end side of the flaps 2.

<Turn Shaft Part>

The turn shaft part 4 is a member that serves as the center about which the flaps 2, 2 turn. The turn shaft part 4 has a solid- or hollow-cylindrical shape extending in the slide direction. The turn shaft part 4 is inserted into the paired first support holes 3d, 3d while being unable to turn or slide.

<Spring Shaft Part>

The spring shaft part 5 is a member that retains the first biasing member 6 at a predetermined position. The spring shaft part 5 has a solid- or hollow-cylindrical shape extending in the slide direction. The spring shaft part 5 is inserted into the paired second support holes 3e, 3e while being unable to turn or slide.

<First Biasing Member>

The first biasing member 6 is a spring that constantly applies a turning bias to the flap 2 in a closing direction. Although a spring used as the first biasing member 6 is a torsion coil spring in the present embodiment, the first biasing member 6 is not particularly limited thereto. The spring shaft part 5 is inserted into the cylindrical coil portion of the first biasing member 6. One end side of the first biasing member 6 is locked by the first spring lock portion 2g of the flap 2 (see FIG. 2). The other end side of the first biasing member 6 is locked at an appropriate location on the circumferential wall of the bracket 3.

<Second Biasing Member>

The second biasing member 7 is a spring that constantly biases the flaps 2, 2 inward in the slide direction, i.e., toward each other. Although a spring used as the second biasing member 7 is a single compression coil spring in the present embodiment, the second biasing member 7 is not particularly limited thereto. One end side of the second biasing member 7 is locked by the second spring lock portion 2h of one flap 2. The other end side of the second biasing member 7 is locked by the second spring lock portion 2h of the other flap 2. In other words, the second biasing member 7 is provided over the paired flaps 2, 2 on the back surface side of the flaps 2, 2. Note that the first biasing member 6 and the second biasing member 7 may be, for example, leaf springs or the like.

<Housing 8>

The housing 8 is, as illustrated in FIG. 1, a housing member that accommodates the flaps 2, 2 and the bracket 3. The housing 8 is shaped like a bottomless cylinder that fits around the bracket 3. A circular insertion hole 8a into which to insert a fuel feeding nozzle is formed as an opening in the center of the upper surface of the housing 8. The rectangular dust discharge hole 8b is formed as an opening in the circumferential surface of the housing 8. The dust discharge hole 8b is formed at a position coinciding with the dust discharge portion 3f of the bracket 3. As illustrated in FIGS. 2 and 3, a restriction surface 8c is formed on the inner circumferential surface of the housing 8. The restriction surface 8c retains the flaps 2, 2 at the closed position against the turning biasing force in the closing direction applied by the first biasing member 6. The restriction surface 8c is in contact with the open/close plate portions 2a and the upper surfaces of the circumferential wall portions 2b.

Next, with reference to FIGS. 5A and 5B, detailed descriptions are given of the extension portions 2e, the first restriction portion 3a, and the second restriction portions 3c. In FIGS. 5A and 5B, extension portions of one flap 2 are denoted by reference numeral 2ea, and extension portions of the other flap 2 are denoted by reference numeral 2eb. Further, the second restriction portions on one side are denoted by reference numeral 3ca, and the second restriction portions on the other side are denoted by reference numeral 3cb.

As illustrated in FIGS. 5A and 5B, the dimension of a part of each extension portion 2ea protruding from the straight edge portion 2m is referred to as a protrusion dimension L3a. Similarly, the dimension of a part of each extension portion 2eb protruding from the straight edge portion 2m is referred to as a protrusion dimension L3b. The protrusion dimension L3a and the protrusion dimension L3b are set to be sufficiently long to such a degree that when the flaps 2, 2 slide radially outside by insertion of a fuel feeding nozzle 9 (see FIG. 6B), the extension portions 2ea, 2eb are constantly in contact with the back surfaces of the other flaps 2.

A plate width dimension L1 of the first restriction portion 3a, a plate width dimension L2a of the second restriction portion 3ca, and a plate width dimension L2b of the second restriction portion 3cb may be appropriately set so that turning restriction of the flaps 2, 2 may be released when the flaps 2, 2 are pressed by the fuel feeding nozzle 9 and slide a predetermined distance. In the present embodiment, the plate width dimension L2a of the second restriction portion 3ca and the plate width dimension L2b of the second restriction portion 3cb are both half the plate width dimension L1 of the first restriction portion 3a.

Next, operation of the erroneous fuel feed prevention device 1 of the present embodiment is described.

<When the Flaps are Closed>

Figure 6A:
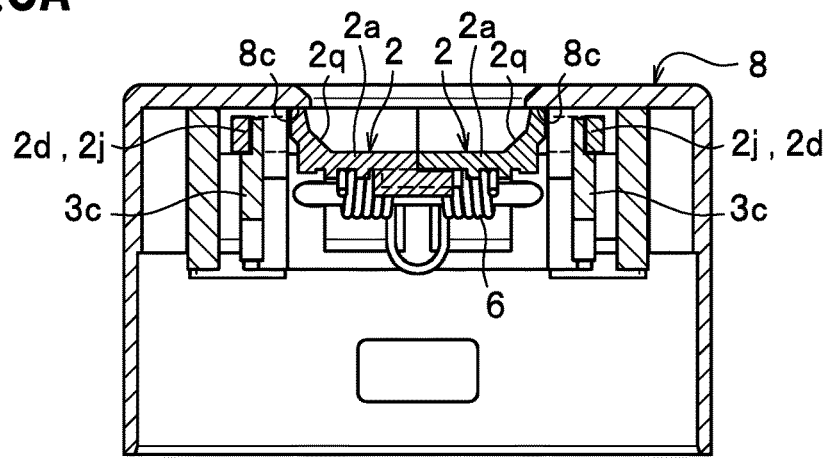
FIGS. 6A to 6C are front sectional views illustrating operation of the erroneous fuel feed prevention device, FIG. 6A being a diagram illustrating the flaps at the closed position, FIG. 6B being a diagram illustrating the flaps having slid apart, and FIG. 6C being a diagram illustrating the flaps at open positions.

FIG. 6A illustrates a state where the flaps 2, 2 are closed by a biasing force applied inward in the slide direction by the second biasing member 7 (see FIG. 3). The flaps 2, 2 are under a turning biasing force in the closing direction from the first biasing member 6, and are retained at predetermined closed positions by being restricted by the restriction surface 8c of the housing 8. In this state, the upper surface of the first restriction portion 3a is in contact with the lower surfaces of the first slide portions 2c (see FIG. 3), and the upper surfaces of the second restriction portions 3c are in contact with the lower surfaces of the main body portions 2j of the second slide portions 2d. Thus, the flaps 2, 2 are unable to turn in the opening direction unless the slant surfaces 2q are pushed.

Since the flaps 2, 2 cannot be opened by a small-diameter fuel feeding nozzle that does not reach the slant surfaces 2q, 2q of both flaps 2, 2 at the same time, erroneous fuel feed by a small-diameter fuel feeding nozzle is prevented. Further, even if the end of a fuel feeding nozzle comes into contact with the slant surfaces 2q, 2q of both flaps 2, 2 to move the flaps 2, 2 radially outward, as long as at least one of the flaps 2, 2 moves less than L1/2 (see FIG. 5A), the flaps 2, 2 are restricted by the first restriction portion 3a and the second restriction portions 3c, 3c not to turn and therefore do not open.

<Flap Opening Operation>

Figure 6B:
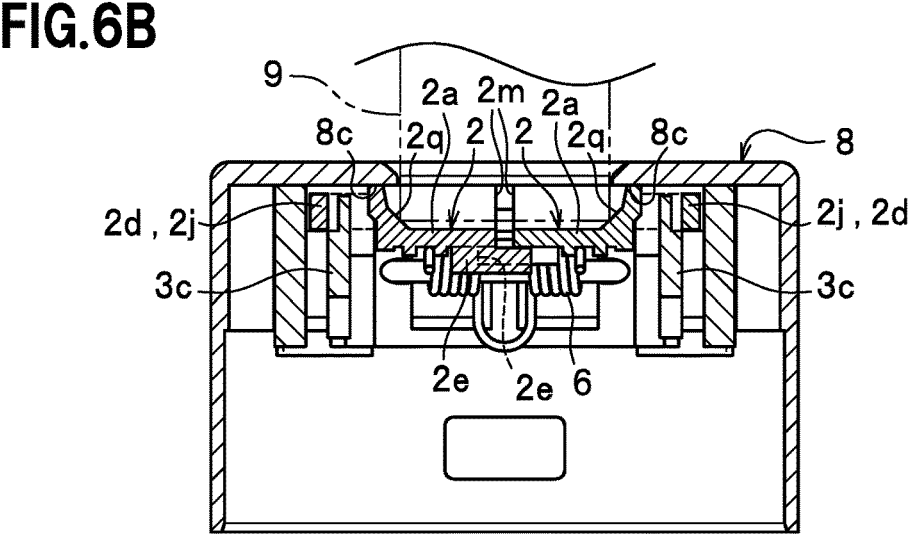

As illustrated in FIG. 6B, when the fuel feeding nozzle 9 with a predetermined diameter is inserted to press the slant surfaces 2q, 2q with the end of the fuel feeding nozzle 9, the flaps 2, 2 slide radially outward against the second biasing member 7. In this event, the attachment portions 2f are guided by the turn shaft part 4 (see FIG. 3), the first slide portions 2c are in sliding contact with the first restriction portion 3a (see FIG. 3), and the main body portions 2j of the second slide portions 2d are in sliding contact with the second restriction portions 3c. Thus, the flaps 2, 2 slide radially outward with stable postures each supported at three points. Further, the extension portions 2e, 2e and the back surfaces of the open/close plate portions 2a, 2a of the other flaps 2, 2 are in sliding contact with each other, and the side surfaces of the respective extension portions 2e, 2e of the flaps 2, 2 are in sliding contact with each other, so that the flaps 2, 2 guide each other. Thus, the flaps 2, 2 slide radially outward with more stable postures. In particular, since the extension portions 2e, 2e are in sliding contact with each other in the slide direction, the flaps 2, 2 slide with the straight edge portions 2m, 2m maintaining to be substantially parallel to each other.

Figure 6C:
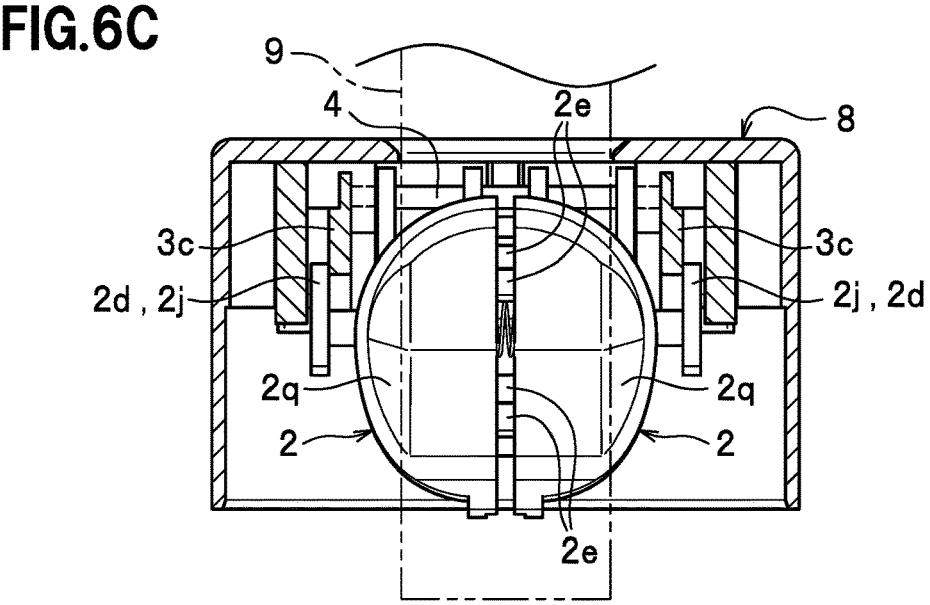

As illustrated in FIG. 6C, when the flaps 2, 2 each move a distance equal to or slightly larger than L1/2, turning restrictions by the first restriction portion 3a and the second restriction portions 3c, 3c are released to allow the flaps 2, 2 to turn in the opening direction. In this event, the extension portions 2e, 2e are constantly in contact with the back surfaces of the other flaps 2, 2, and therefore the flaps 2, 2 can turn in an integrated manner. Further, when the flaps 2, 2 turn in the opening direction, the side surfaces of the main body portions 2j come into sliding contact with the second restriction portions 3c, and thereby the flaps 2, 2 turn while being maintained at positions reached by sliding radially outward (a state where the flaps 2, 2 are spaced apart from each other).

When the fuel feeding nozzle 9 is pulled off, the biasing force from the first biasing member 6 turns the flaps 2, 2 in an integrated manner in the closing direction. Also, when the flaps 2, 2 turn from the open position to the closed position, the side surfaces of the main body portions 2j come into sliding contact with the second restriction portions 3c, and thus the flaps 2 turn while being maintained at positions reached by sliding radially outward. Thereby, immediately before the flaps 2, 2 close, the first restriction portion 3a and the first slide portions 2c do not interfere with each other. At the same time that the flaps 2, 2 finish turning, the main body portions 2j are released from the restriction by the second restriction portions 3c, and the flaps 2, 2 are caused to slide radially inward by the biasing force of the second biasing member 7 and abut against each other. Thereby, as illustrated in FIG. 6A, the flaps 2, 2 can return to the closed position.

<Half-Opening Prevention Mechanism>

As illustrated in FIGS. 5A and 5B, when the fuel feeding nozzle 9 is inserted with the end of the fuel feeding nozzle 9 pressing the slant surface 2q of only one flap 2, only the one flap 2 slides radially outward against the second biasing member 7. Even if the one flap 2 moves a distance equal to or slightly larger than L1/2 to release the first restriction portion 3a and the second restriction portions 3ca on the one flap 2 side, the extension portions 2eb, which are set to be long enough to be constantly in contact with the back surface of the one flap 2, support the back surface of the one flap 2 and do not allow the one flap 2 to turn. Thereby, it can be prevented that only one of the flaps 2, 2 is opened. In other words, in the present embodiment, the flaps 2, 2 can turn when both the flaps 2, 2 move a distance equal to or slightly larger than L1/2.

<Half-Closing Prevention Mechanism>

Assume a case where after the flaps 2, 2 turn from the turning allowed position illustrated in FIG. 5B to the open position, the fuel feeding nozzle 9 is slanted or shifted to one side, coming into contact with only one of the flaps 2. Even in such a case, since the extension portions 2eb are set to be long enough to be constantly in contact with the back surface of the one flap 2, the one flap 2 restricts turning of the other flap 2. Thus, it can be prevented that only one of the flaps 2, 2 is closed.

According to the present embodiment described above, the extension portions 2e, 2e cause the paired flaps 2, 2 to turn in an integrated manner. Thus, even if the fuel feeding nozzle 9 is inserted or removed in a manner slanted or shifted to one side, troubles such as opening or closing of only one of the flaps 2, 2 do not occur. Thus, operational malfunction of the flaps 2, 2 is reduced.

In addition, according to the present embodiment, the extension portions 2e, 2e have not only a function to guide sliding of the paired flaps 2, 2, but also a function to cause the paired flaps 2, 2 to turn in an integrated manner, and therefore the number of parts can be reduced to simplify the structure.

In addition, according to the present embodiment, the extension portions 2e, 2e are in sliding contact with each other in the slide direction, and thus can stabilize sliding operation of the paired flaps 2, 2.

In addition, according to the present embodiment, two pairs of extension portions 2e, 2e are provided to be able to stabilize the integrated turning operation and sliding operation of the paired flaps even more.

In addition, according to the present embodiment, the second biasing member 7 allows the flaps 2, 2 to slide inward in radial directions of the fuel feed passage and be retained at the closed position. The retention of the flaps 2, 2 at the closed position prevents intrusion of dust and the like from between the flaps 2, 2 into the depth of the fuel feed passage.

In addition, according to the present embodiment, the paired flaps 2, 2 are biased to slide by the single second biasing member 7, and thus the structure is simplified.

Although the embodiment of the present invention has been described above, the present invention is not limited thereto and can be appropriately changed without departing from the gist of the present invention. Although biased inward in the slide direction in an integrated manner by the single second biasing member 7 in the present embodiment, the paired flaps 2, 2 may be individually biased inward in the slide direction by a plurality of second biasing members 7.

Although the single turn shaft part 4 formed separately from the flaps 2, 2 is used in the present embodiment, turn shaft parts 4A, 4A may be formed integrally with the respective flaps 2, 2, as illustrated in FIGS. 7A and 7B. In the modification illustrated in FIGS. 7A and 7B, recessed, groove-shaped support grooves 31 which open upward are formed in the bracket 3. The support grooves 31 function as support portions that support the turn shaft parts 4A. Three support grooves 31 are provided, extending in the slide direction and spaced apart from each other in the slide direction. Each turn shaft part 4A is set in adjacent two support grooves 31, 31 while being turnable and being slidable along the support grooves 31, 31. The support groove 31 at the center is used by the two turn shaft parts 4A, 4A. According to the present modification, the turn shaft part 4A, 4A formed integrally with the respective flaps 2, 2 are slidable along the support grooves 31, and therefore the paired flaps 2, 2 move toward and away from each other with a simple configuration. In other words, the present modification having the turn shaft parts 4A formed integrally with the flaps 2 produces substantially the same advantageous effects as those produced by the present embodiment.

REFERENCE SIGNS LIST 1 erroneous fuel feed prevention device
2 flap
2e extension portion
2q slanted surface
3 bracket
3a first restriction portion (restriction portion)
3c second restriction portion (restriction portion)
3d first support hole (support portion)
3l support groove (support portion)
4, 4A turn shaft part
5 spring shaft part
6 first biasing member
7 second biasing member
8 housing
9 fuel feeding nozzle

The invention claimed is:

1. An erroneous fuel feed prevention device to be provided on a fuel feed passage to block insertion of a small-diameter fuel feeding nozzle and permit insertion of a large-diameter fuel feeding nozzle, the device comprising:

paired flaps each having a slanted surface that is slanted relative to a direction of insertion of the large-diameter fuel feeding nozzle and is to be pressed by the large-diameter fuel feeding nozzle, the paired flaps being slidable in radial directions of the fuel feed passage and being turnable in the direction of insertion;

a turn shaft part about which the flaps turn;

a support portion supporting the turn shaft part;

paired extension portions extending from a first flap and a second flap of the flaps toward the second flap and the first flap respectively, being in contact with back surfaces of the second flap and the first flap respectively, and being in sliding contact with the second flap and the first flap in a slide direction respectively;

a first biasing member configured to bias the flaps to turn in a closing direction; and a restriction portion configured to restrict the flaps from turning in an opening direction, wherein while slanted surfaces are pressed by the large-diameter fuel feeding nozzle, each of the flaps slides outward in radial directions of the fuel feed passage to release a turning restriction state of the restriction portion, and after the release, the flaps turn in an integrated manner with the extension portions being in contact with the respective other flap.

2. The erroneous fuel feed prevention device according to claim 1,
wherein the paired extension portions are in sliding contact with each other in the slide direction.

3. The erroneous fuel feed prevention device according to claim 1, further comprising: a second biasing member that biases the flaps to slide toward each other.

4. The erroneous fuel feed prevention device according to claim 3,
wherein the second biasing member is provided over the paired flaps.

5. The erroneous fuel feed prevention device according to claim 1,
wherein plural pairs of the extension portions are provided.

6. The erroneous fuel feed prevention device according to claim 1,
wherein the turn shaft part is provided to each of the flaps and slidable along the support portion.

* * * * *